US012662080B2

(12) United States Patent　　(10) Patent No.: US 12,662,080 B2

Hirai et al.　　(45) Date of Patent: Jun. 23, 2026

(54) LOCKING TONGUE FOR SEAT BELT AND SEAT BELT DEVICE

(71) Applicant: ASHIMORI INDUSTRY CO., LTD., Settsu (JP)

(72) Inventors: Toru Hirai, Osaka (JP); Tomoe Nakayama, Osaka (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 0 days.

(21) Appl. No.: 19/313,435

(22) Filed: Aug. 28, 2025

(65) Prior Publication Data

US 2026/0061962 A1　Mar. 5, 2026

(30) Foreign Application Priority Data

Aug. 30, 2024　(JP) ................................. 2024-148364

(51) Int. Cl.
　　*B60R 22/18*　　(2006.01)
　　*B60R 22/185*　　(2006.01)
(52) U.S. Cl.
　　CPC .. *B60R 22/1855* (2013.01); *B60R 2022/1812* (2013.01)
(58) Field of Classification Search
　　CPC .......... B60R 22/185; B60R 2022/1812; B60R 22/1855; A44B 11/2561; A44B 11/2557; Y10T 24/4736; Y10T 24/4016; Y10T 24/45623
　　See application file for complete search history.

(56) References Cited

U.S. PATENT DOCUMENTS

| | | | | |
|---|---|---|---|---|
| 5,870,816 | A * | 2/1999 | McFalls | .................. B60R 22/30 |
| | | | | 29/434 |
| 7,325,280 | B2 | 2/2008 | Ichida | |
| 8,820,788 | B2 * | 9/2014 | Goudeau | ............ A44B 11/2557 |
| | | | | 280/806 |
| 9,409,537 | B2 * | 8/2016 | Zhang | ..................... B60R 22/28 |
| 9,615,632 | B2 * | 4/2017 | Okano | ............... A44B 11/2561 |
| 11,254,282 | B2 * | 2/2022 | Garcia Stopier | ... B60R 22/1855 |
| 2012/0286501 | A1 * | 11/2012 | Goudeau | ............ A44B 11/2557 |
| | | | | 280/801.1 |
| 2019/0263350 | A1 * | 8/2019 | Ruthinowski | ...... A44B 11/2557 |

FOREIGN PATENT DOCUMENTS

| | | |
|---|---|---|
| DE | 102014115263 B4 | 5/2019 |
| JP | 2006182103 A | 7/2006 |
| JP | 201520580 A | 2/2015 |

* cited by examiner

*Primary Examiner* — Toan C To

(74) *Attorney, Agent, or Firm* — Alleman Hall LLP

(57)　　ABSTRACT

A locking tongue for a seat belt of a vehicle according to one embodiment includes: a tongue body including a main wall and a pair of side walls; a clamp member slidable in a direction toward the main wall; a rotating member rotatably supported by the side walls; and an urging member that urges the clamp member in a direction away from the main wall. In a normal state, a gap larger than a thickness of a webbing that is the seat belt is formed between the clamp member and the main wall. In an emergency of the vehicle, tension of a lap belt becomes greater than tension of a shoulder belt, causing the rotating member to rotate in a direction from the shoulder belt toward the lap belt against urging force of the urging member, such that the webbing is clamped between the clamp member and the main wall.

6 Claims, 13 Drawing Sheets

LOCKING TONGUE FOR SEAT BELT AND SEAT BELT DEVICE

CROSS-REFERENCE TO RELATED APPLICATIONS

This application claims priority to and the benefit of Japanese Patent Application No. 2024-148364, filed on Aug. 30, 2024, the entire disclosure of which is incorporated herein by reference.

BACKGROUND OF THE INVENTION

Field of the Invention

The present application relates to a locking tongue for a seat belt and a seat belt device including the locking tongue.

Description of the Related Art

In a seat belt device installed on a vehicle, a tongue penetrated by a webbing that is a seat belt is operated to switch the state of the webbing (the seat belt) between an unfastened state in which the webbing is extended and a fastened state in which the webbing is folded back to form a shoulder belt and a lap belt. In an emergency of the vehicle, for example, when the vehicle gets involved in a collision, with the webbing in the fastened state, there is a case where a passenger in the vehicle is moved forward due to inertial force, and as a result, the shoulder belt gets pulled into the lap belt side via the tongue. In view of this, there has been a proposed locking tongue for a seat belt, the locking tongue being configured such that when the webbing is in the fastened state, if an emergency of the vehicle occurs, the locking tongue clamps the webbing to prevent the shoulder belt from getting pulled into the lap belt side, thereby restraining forward movement of the passenger's waist that is caused when the lap belt side gets longer and preventing excessive tightening of the shoulder belt on the passenger that is caused when the shoulder belt side gets shorter.

For example, Japanese Laid-Open Patent Application Publication No. 2006-182103 discloses a locking tongue 100 for a seat belt as shown in FIG. 12. The locking tongue 100 includes a tongue body 110, a webbing guide 120, and a lock bar 140.

The tongue body 110 includes: a main wall 111 in the shape of a rectangular frame, the main wall 111 including a pair of long-side portions and a pair of short-side portions; an insertion portion 112, which extends from one of the long-side portions of the main wall 111; and a pair of side walls 113 and 114, which rise from both the short-side portions of the main wall 111, respectively. The webbing guide 120 is rotatably supported by the side walls 113 and 114 of the tongue body 110 via a rotating shaft 130. The lock bar 140 is rotatably coupled to the webbing guide 120 via a pair of rotating shafts 150.

The locking tongue 100 further includes a bar spring 160, which urges the lock bar 140 such that the lock bar 140 is kept in a normal position as shown in FIG. 13A. A webbing 200 is, when it is in the fastened state, wound around the webbing guide 120 such that the webbing 200 is folded back to form a shoulder belt 210 and a lap belt 220.

If the tension of the lap belt 220 increases in an emergency of a vehicle, the webbing guide 120 rotates in a direction from the shoulder belt 210 toward the lap belt 220 as shown in FIG. 13B, and as a result, the lock bar 140 linearly moves while rotating, and the webbing 200 is clamped between the lock bar 140 and the long-side portion of the main wall 111, the long-side portion being positioned at the opposite side to the insertion portion 112.

SUMMARY OF THE INVENTION

However, since the locking tongue 100 of Japanese Laid-Open Patent Application Publication No. 2006-182103 requires the rotating shaft 130 for the webbing guide 120 and also requires the rotating shafts 150 for the lock bar 140, there is a problem of increase in the size of the locking tongue 100.

In view of the above, an object of the present application is to provide a locking tongue for a seat belt, the locking tongue making it possible to suppress an increase in the size thereof.

One aspect of the present application provides a locking tongue for a seat belt of a vehicle, the locking tongue being operated to switch a state of a webbing that is the seat belt between an unfastened state in which the webbing is extended and a fastened state in which the webbing is folded back to form a shoulder belt and a lap belt, the locking tongue being configured such that when the webbing is in the fastened state, in a normal state, the locking tongue allows the webbing to pass therethrough, whereas in an emergency of the vehicle, the locking tongue clamps the webbing, the locking tongue including: a tongue body including a main wall, a pair of side walls, and an insertion portion, the main wall being positioned at a front side of the webbing when the webbing is in the unfastened state, the pair of side walls protruding from both end portions of the main wall in a width direction of the webbing to a back side of the webbing, the insertion portion extending from the main wall and being a portion to be inserted in a buckle for the seat belt; a clamp member that is, when the webbing is in the unfastened state, positioned at the back side of the webbing and engaged with guides that are provided on the pair of side walls, respectively, such that the clamp member is slidable in a direction toward the main wall; a rotating member that is rotatably supported by the pair of side walls at the back side of the webbing when the webbing is in the unfastened state, wherein when the webbing is in the fastened state, the webbing is wound around the rotating member such that the webbing is folded back to form the shoulder belt and the lap belt, and the rotating member rotates in a direction from the shoulder belt toward the lap belt to press the clamp member such that the clamp member slides in the direction toward the main wall; and an urging member that urges the clamp member in a direction away from the main wall. In the normal state, a gap larger than a thickness of the webbing is formed between the clamp member and the main wall. In the emergency of the vehicle, tension of the lap belt becomes greater than tension of the shoulder belt, causing the rotating member to rotate in the direction from the shoulder belt toward the lap belt against urging force of the urging member, such that the webbing is clamped between the clamp member and the main wall.

Another aspect of the present application provides a seat belt device including: the above-described locking tongue; the buckle for the seat belt, the buckle being fixed to the vehicle and to be engaged with the locking tongue; the webbing that penetrates the locking tongue and whose one end side is fixed to the vehicle; and a retractor that accommodates therein the other end side of the webbing in such a manner that the other end side of the webbing is pullable out of the retractor.

The present application provides a locking tongue for a seat belt, the locking tongue making it possible to suppress an increase in the size thereof.

BRIEF DESCRIPTION OF THE DRAWINGS

FIGS. 1A and 1B each show a schematic configuration of a seat belt device including a locking tongue for a seat belt according to one embodiment, FIG. 1A showing a webbing in an unfastened state, FIG. 1B showing the webbing in a fastened state.

DETAILED DESCRIPTION

Figures 1A, 1B:
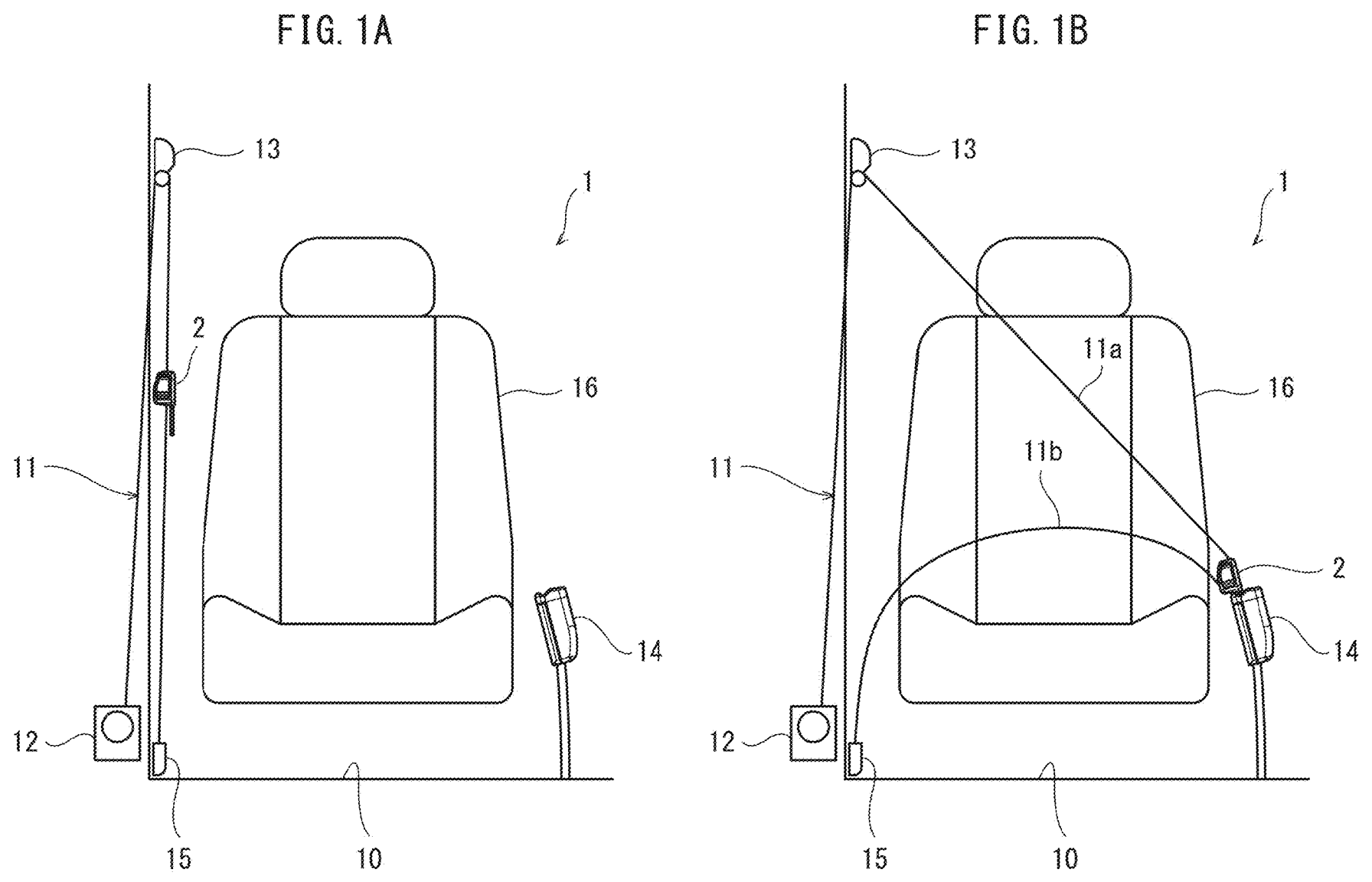
Figure 2:
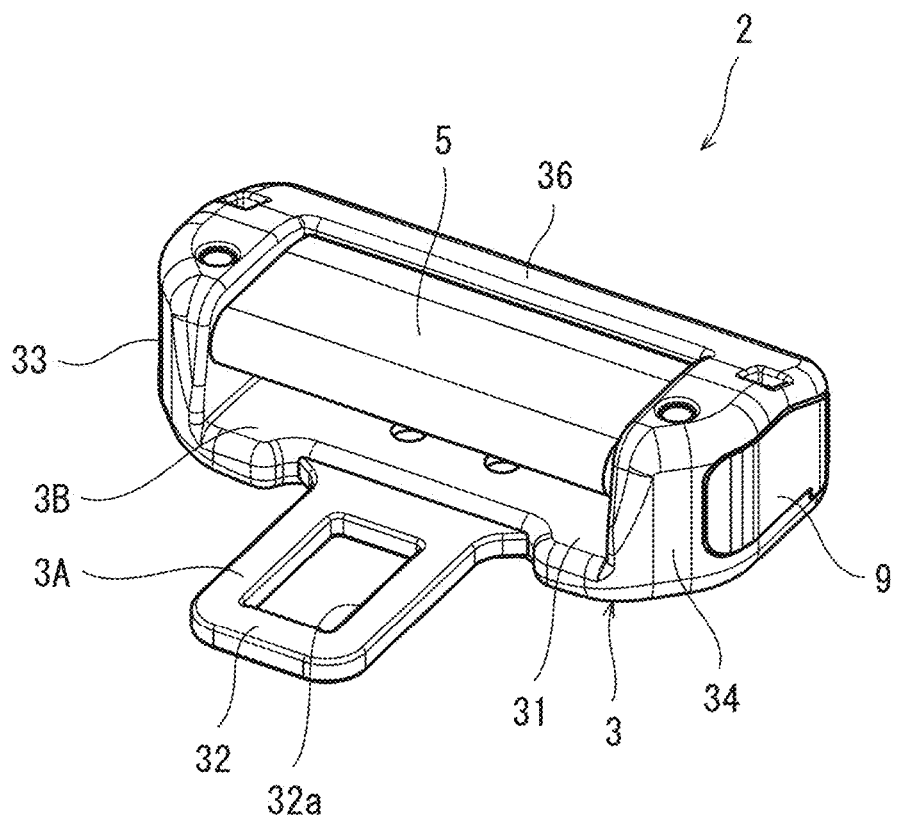
FIG. 2 is a perspective view of the locking tongue.

FIGS. 1A and 1B each show a seat belt device 1 including a locking tongue 2 for a seat belt according to one embodiment. The seat belt device 1 is to be installed on a vehicle 10. In addition to the locking tongue 2, the seat belt device 1 further includes: a webbing 11, which is a seat belt; and a retractor 12 and a buckle 14 for a seat belt, which are fixed to the vehicle 10.

The seat belt device 1 shown in FIGS. 1A and 1B is intended for a front seat, and includes a shoulder anchor 13 fixed to a side wall of the vehicle 10 above the retractor 12. The webbing 11 is slidably looped over the shoulder anchor 13. Alternatively, the seat belt device 1 may be intended for a back seat.

The webbing 11 penetrates the locking tongue 2, and one end side of the webbing 11 is fixed to the vehicle 10 via a belt anchor 15. The retractor 12 accommodates therein the other end side of the webbing 11 in such a manner that the other end side of the webbing 11 is pullable out of the retractor 12. When the webbing 11 is rapidly pulled out of the retractor 12, or when the acceleration of the vehicle 10 has changed greatly, the retractor 12 locks the webbing 11, preventing it from being pulled out of the retractor 12.

Figure 6:
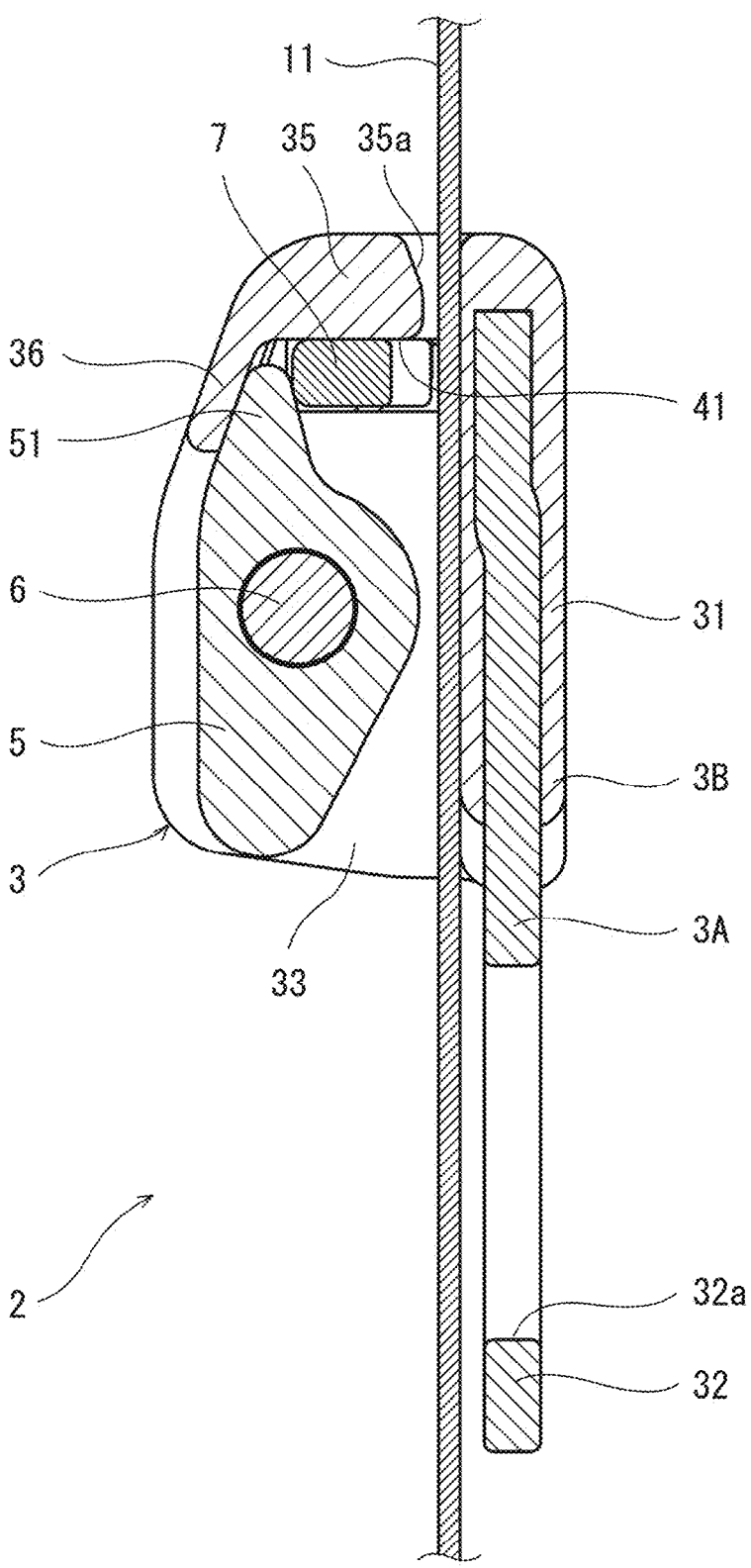
FIG. 6 is a sectional view of the locking tongue when the webbing is in the unfastened state.
Figure 7:
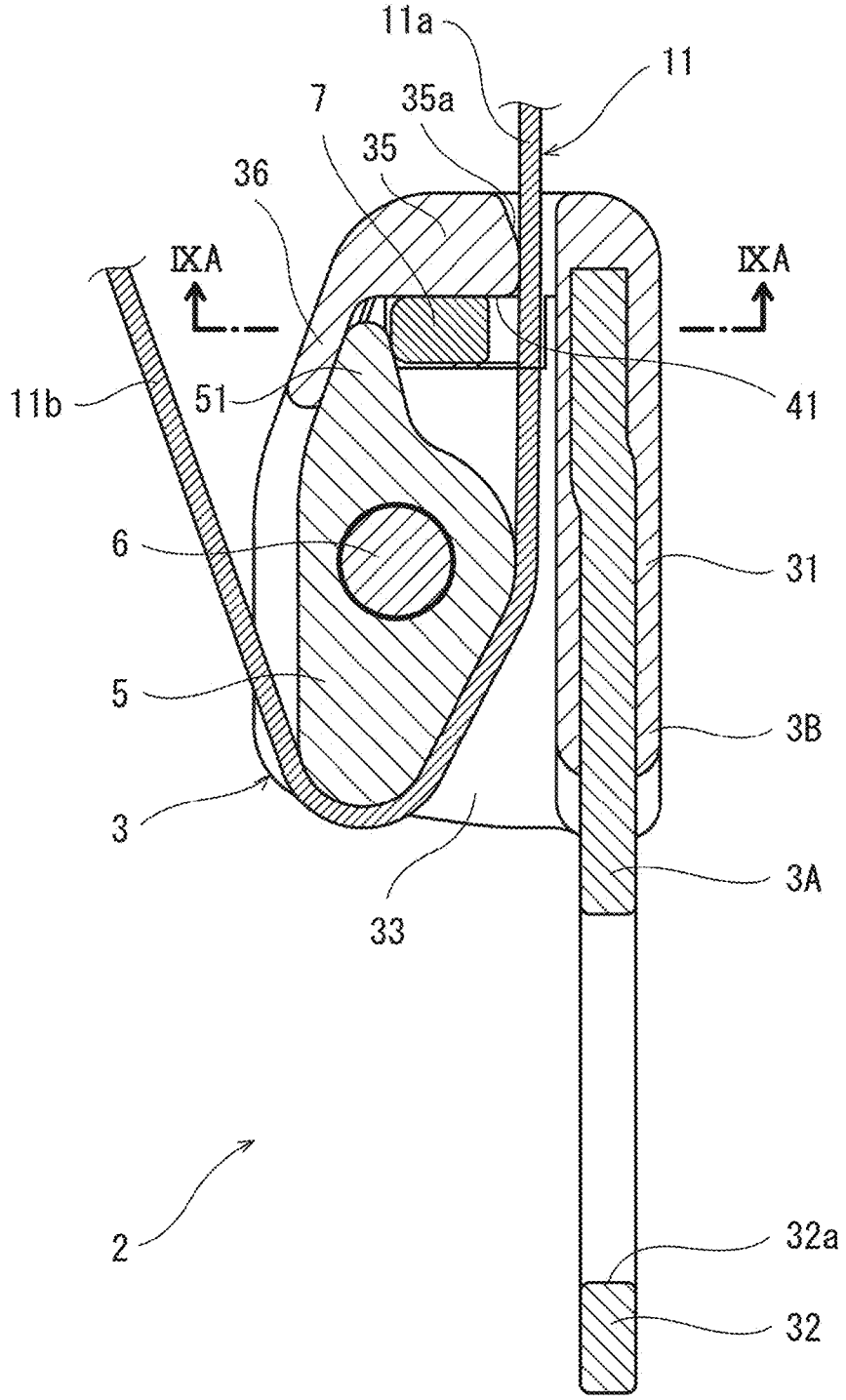
FIG. 7 is a sectional view of the locking tongue when the webbing is in the fastened state in a normal state.

The locking tongue 2 is operated to switch the state of the webbing 11 between an unfastened state in which the webbing 11 is extended as shown in FIG. 1A and FIG. 6 and a fastened state in which the webbing 11 is folded back to form a shoulder belt 11a and a lap belt 11b as shown in FIG. 1B and FIG. 7. That is, the webbing 11 is, when it is in the unfastened state, extended in a straight line from the shoulder anchor 13 to the belt anchor 15 due to winding force of the retractor 12.

When the webbing 11 is in the fastened state, the locking tongue 2 is engaged with the buckle 14. When the webbing 11 is in the fastened state, in a normal state, the locking tongue 2 allows the webbing 11 to pass therethrough, whereas in an emergency of the vehicle, the locking tongue 2 clamps the webbing 11.

Figure 3:
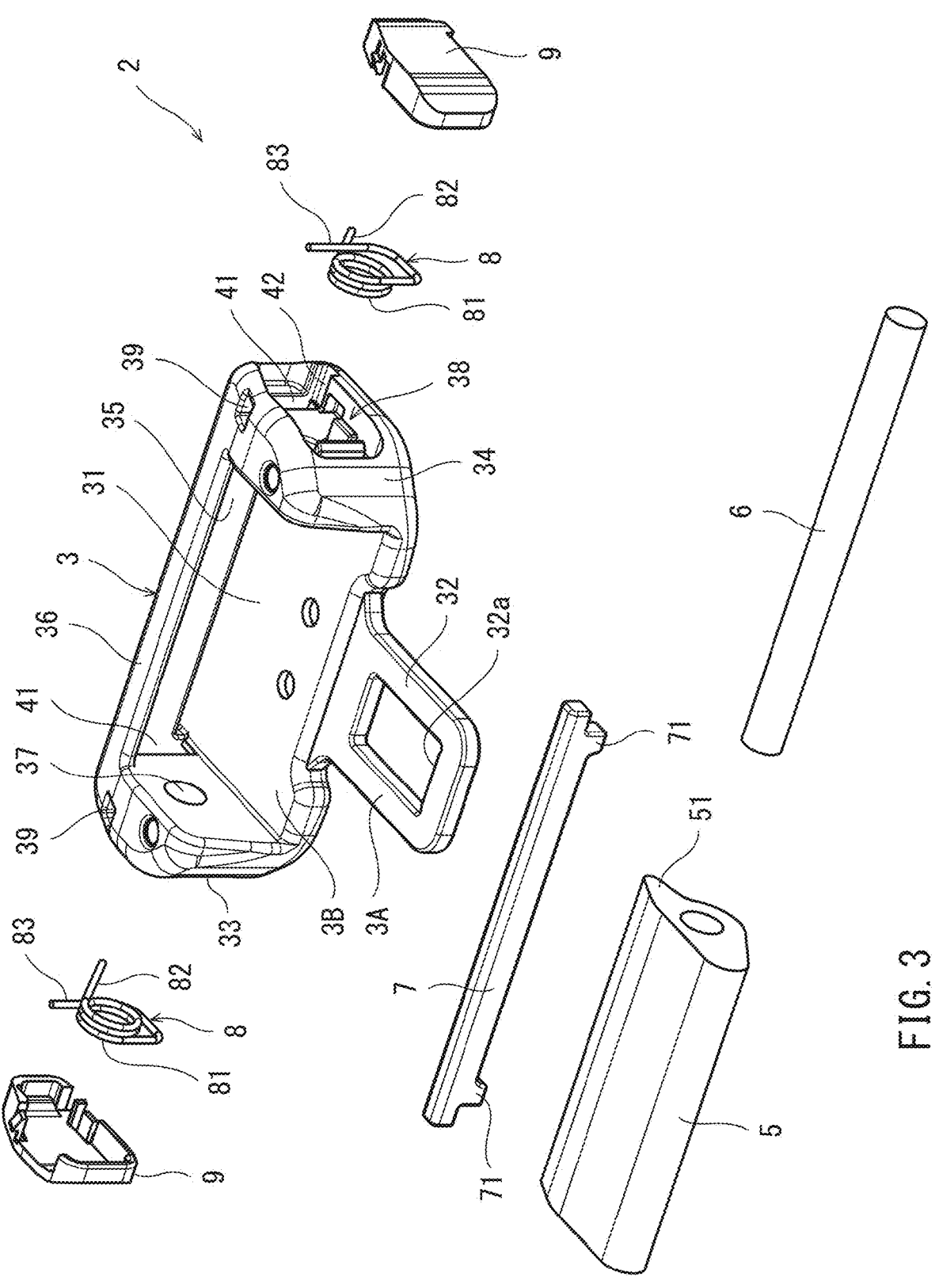
FIG. 3 is an exploded perspective view of the locking tongue.

Specifically, as shown in FIG. 2 and FIG. 3, the locking tongue 2 includes: a tongue body 3; a rotating member 5 supported by the tongue body 3; and a clamp member 7 operated by the rotating member 5. As shown in FIG. 6, the tongue body 3 includes a main wall 31. The main wall 31 is, when the webbing 11 is in the unfastened state, positioned at the front side of the webbing 11. The front side of the webbing 11 in the unfastened state means, as shown in FIG. 1A, the side that can be touched by a passenger seated on a seat 16, for which the seat belt device 1 is intended (in FIG. 1A, the front side of the webbing 11 is the side facing in a direction toward the interior side of the vehicle). On the other hand, the back side of the webbing 11 in the unfastened state means the opposite side to the side that can be touched by the passenger seated on the seat 16, for which the seat belt device 1 is intended (in FIG. 1A, the back side of the webbing 11 is the side facing in a direction toward the exterior side of the vehicle).

In the present embodiment, as shown in FIG. 6, the main wall 31 includes: one flat surface that makes surface contact with the webbing 11 in the unfastened state (i.e., a surface that faces in the same direction as the facing direction of the back side of the webbing 11 in the unfastened state); and the other flat surface that faces in the opposite direction to the facing direction of the one flat surface (i.e., a surface that faces in the same direction as the facing direction of the front side of the webbing 11 in the unfastened state). The main wall 31 is substantially rectangular plate-shaped. The longitudinal direction of the main wall 31 is the width direction of the webbing 11, and the width direction of the main wall 31 is the extending direction of the webbing 11 in the unfastened state.

Figures 9A, 9B:
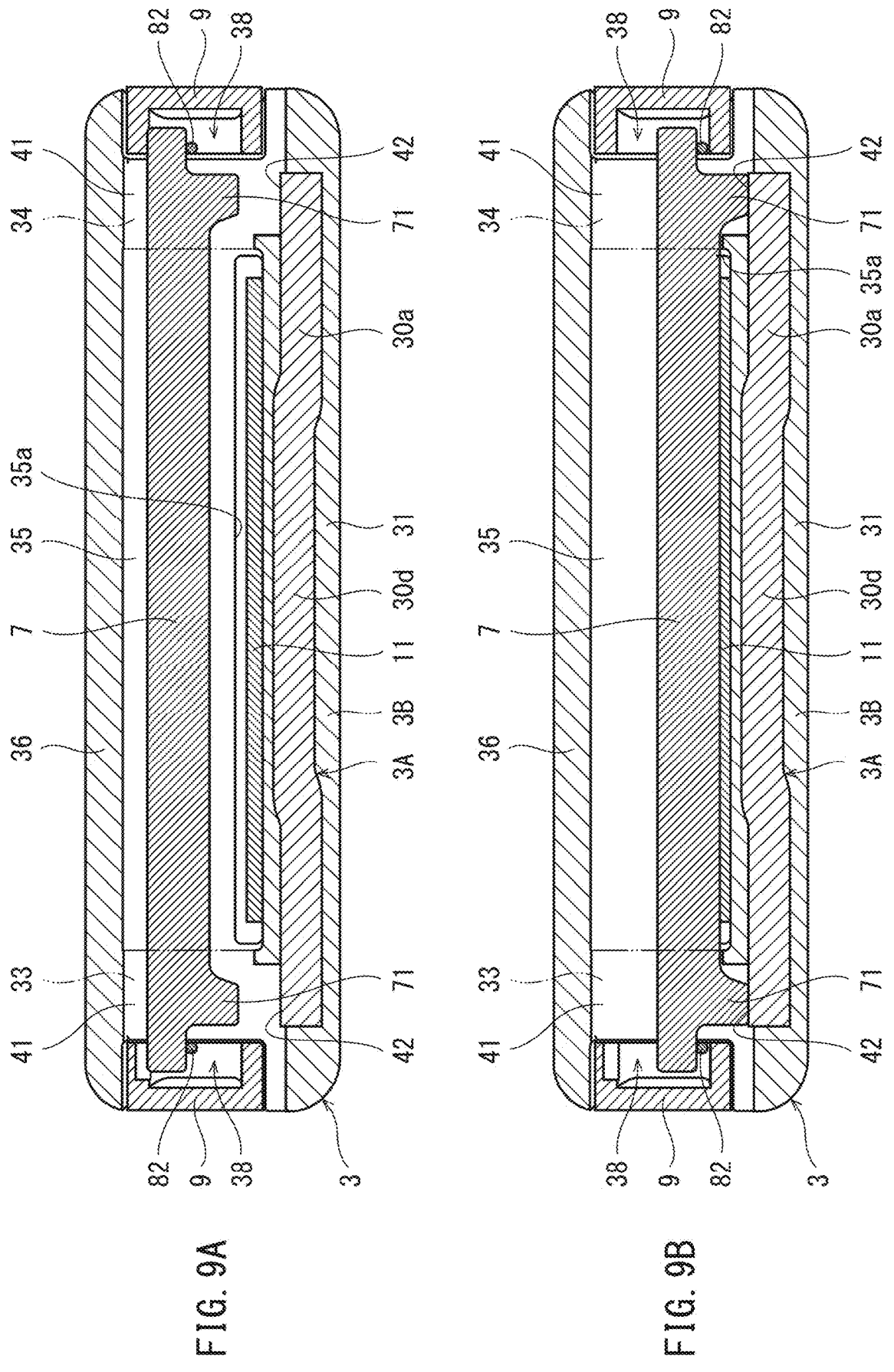
FIG. 9A is a sectional view taken along line IXA-IXA of FIG. 7.
FIG. 9B is a sectional view taken along line IXB-IXB of FIG. 8.

In addition to the main wall 31, as shown in FIG. 3, the tongue body 3 further includes a pair of side walls 33 and 34, an insertion portion 32, a back wall 35, and an overhang 36. The side walls 33 and 34 protrude from both end portions of the main wall 31 in the width direction of the webbing 11, i.e., protrude from both end portions of the main wall 31 in the longitudinal direction of the main wall 31, to the back side of the webbing 11. As shown in FIG. 9A, the distance between the side walls 33 and 34 is slightly greater than the width of the webbing 11.

Returning to FIG. 3, the insertion portion 32 is a portion to be inserted into the buckle 14. The insertion portion 32 extends from the main wall 31 in such a manner that the insertion portion 32 together with the main wall 31 extends along the webbing 11 in the unfastened state. The insertion portion 32 includes an opening 32a to be engaged with the buckle 14. In the present embodiment, the insertion portion 32 extends in the width direction of the main wall 31. Alternatively, the insertion portion 32 may extend in a direction that is inclined relative to the width direction of the main wall 31.

The aforementioned rotating member 5 is, when the webbing 11 is in the unfastened state, rotatably supported by the side walls 33 and 34 via a rotating shaft 6 at the back side of the webbing 11. Specifically, each of the side walls 33 and 34 includes a fitting hole 37 to be fitted to an end portion of the rotating shaft 6. Each of the side walls 33 and 34 includes a recess 38, which is open outward in the width direction of the webbing 11. The recess 38 accommodates therein an urging member 8, and the opening of the recess 38 is closed by a cover member 9.

The back wall 35 extends in the width direction of the webbing 11 in a manner to bridge end portions of the respective side walls 33 and 34, the end portions being positioned at the opposite side to the insertion portion 32. As shown in FIG. 6, an insertion hole 35a for the webbing 11 is formed between the back wall 35 and the main wall 31. It should be noted that the back wall 35 can be eliminated.

The overhang 36 protrudes from an end portion of the back wall 35, the end portion being positioned at the opposite side to the insertion hole 35a, along the contour of each of the side walls 33 and 34. Similar to the back wall 35, the overhang 36 bridges the side walls 33 and 34. In a direction in which the main wall 31 and the insertion portion 32 are arranged side by side, the length of the overhang 36 is about ⅓ of the length of the side walls 33 and 34. That is, the overhang 36 faces the main wall 31 such that a space facing the back wall 35 is present between the overhang 36 and the main wall 31.

The aforementioned clamp member 7 is, when the webbing 11 is in the unfastened state, positioned at the back side of the webbing 11. The clamp member 7 is a rod-shaped member extending in the width direction of the webbing 11. In the present embodiment, the clamp member 7 is, in a direction along the main wall 31 of the tongue body 3, positioned at the opposite side to the insertion portion 32 with respect to the center of rotation of the rotating member 5.

Each of the side walls 33 and 34 of the tongue body 3 includes a guide 41 for the clamp member 7. The clamp member 7 is engaged with the guides 41 such that the clamp member 7 is slidable in a direction toward the main wall 31. In the present embodiment, each guide 41 is a slit extending in the thickness direction of the main wall 31. Accordingly, the clamp member 7 linearly slides in the thickness direction of the main wall 31.

To be more specific, one side surface of each slit, i.e., one side surface of each guide 41, forms a wall surface that is continuous with a surface of the back wall 35 on the insertion portion 32 side. Through the guides 41, the space between the side walls 33 and 34 communicates with the aforementioned recesses 38.

Further, in the present embodiment, the clamp member 7 includes, at both end portions thereof, projections 71 protruding toward the main wall 31 of the tongue body 3. The distance between the projections 71 is greater than the width of the webbing 11. On the other hand, the main wall 31 includes restrictors 42. When the clamp member 7 has slid in a direction toward the main wall 31, the restrictors 42 come into contact with the distal ends of the projections 71 of the clamp member 7, respectively, to restrict an amount of clamping by which the webbing 11 is clamped by the clamp member 7 (i.e., an amount by which the webbing 11 is pressed). Alternatively, instead of the main wall 31, the side walls 33 and 34 may include the respective restrictors 42.

Figure 5:
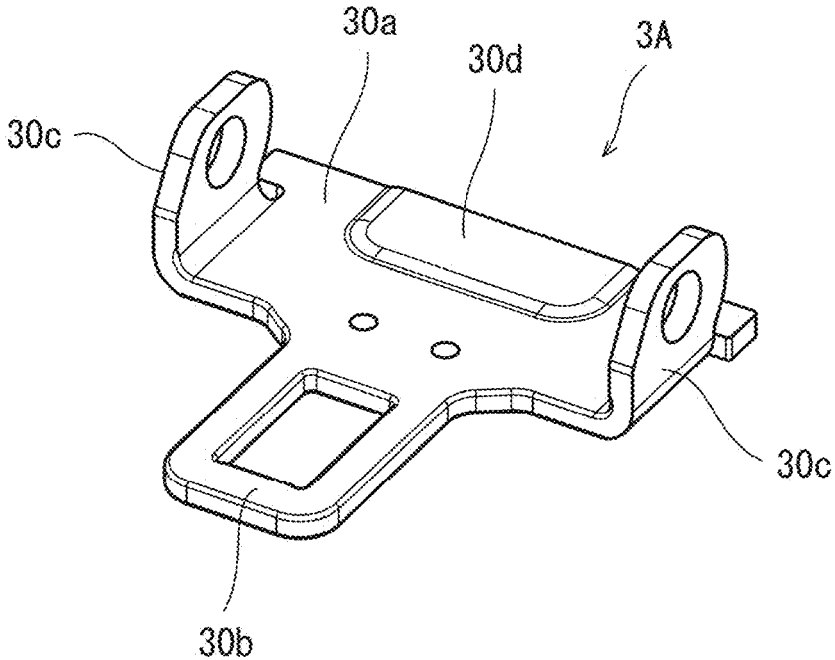
FIG. 5 is a perspective view of a tongue plate.

The tongue body 3 is a molded product including a metal tongue plate 3A and a resin portion 3B. Most of the metal tongue plate 3A is covered by the resin portion 3B. As shown in FIG. 5, the tongue plate 3A includes: a substantially rectangular base portion 30a; a protruding portion 30b, which protrudes in the width direction of the base portion 30a from the middle of the base portion 30a; and bent portions 30c, which are bent from both ends of the base portion 30a in the longitudinal direction of the base portion 30a. The protruding portion 30b forms the insertion portion 32. The base portion 30a is the core of the main wall 31. The bent portions 30c are the cores of the respective side walls 33 and 34.

As shown in FIG. 9A, parts of the base portion 30a are exposed from the resin portion 3B, and these exposed parts of the base portion 30a form the aforementioned restrictors 42. Then, as shown in FIG. 9B, the restrictors 42 can be contacted by the projections 71 of the metal clamp member 7, respectively. That is, when the projections 71 are in contact with the respective restrictors 42, the webbing 11 is positioned inward of the pair of projections 71.

In the present embodiment, as shown in FIG. 5 and FIG. 9A, a protrusion 30d whose width is less than the width of the webbing 11 is provided on the base portion 30a at a position corresponding to the middle portion of the clamp member 7. Meanwhile, as described above, one surface of the main wall 31 on the webbing 11 side is entirely flat. Alternatively, the one surface of the main wall 31 on the webbing 11 side may be provided with a recess or a protrusion. Instead of the protrusion 30d being provided on the base portion 30a of the tongue plate 3A, the base portion 30a may be entirely flat.

Each of the aforementioned urging members 8 urges the clamp member 7 in a direction away from the main wall 31 of the tongue body 3 within the aforementioned recess 38 of the side wall (33 or 34). In the present embodiment, each urging member 8 is a twisted coil spring. Alternatively, each urging member 8 may be a compression coil spring, or may be an elastic object made of rubber or elastomer.

Figure 4:
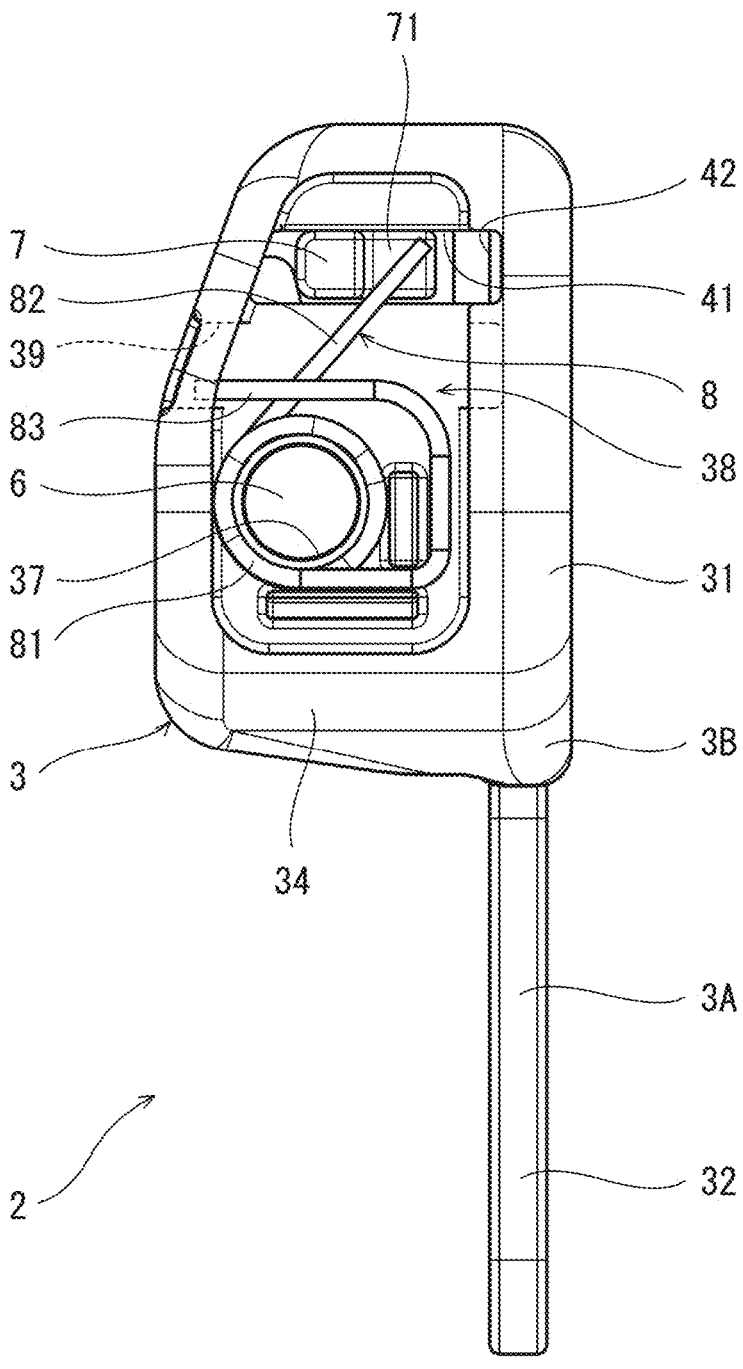
FIG. 4 is a side view of the locking tongue in a state where a cover is removed from a side wall of a tongue body.

As shown in FIG. 4, the twisted coil spring serving as the urging member 8 includes: a coiled portion 81, in which an end portion of the rotating shaft 6 is inserted; a linear first end portion 82, which extends from the coiled portion 81; and a substantially U-shaped second end portion 83, which extends from the coiled portion 81. At a position outward of the projection 71, the first end portion 82 urges the clamp member 7 in a direction away from the main wall 31. The distal end of the second end portion 83 is inserted in an engagement hole 39 formed in the side wall (33 or 34).

The engagement hole 39 is utilized also for mounting the cover member 9. Specifically, the cover member 9 includes an engagement claw to be engaged with the engagement hole 39. Both the cover members 9 serve also to hold the rotating shaft 6.

As shown in FIG. 7, when the webbing 11 is in the fastened state, the webbing 11 is wound around the aforementioned rotating member 5 such that the webbing 11 is folded back to form the shoulder belt 11a and the lap belt 11b. The rotating member 5 extends in the width direction of the webbing 11 and has a constant cross section. The rotating member 5 rotates in a direction from the shoulder belt 11a toward the lap belt 11b to press the clamp member 7 such that the clamp member 7 slides in a direction toward the main wall 31.

In the present embodiment, the rotating member 5 includes a pressing portion 51 interposed between the clamp member 7 and the overhang 36 of the tongue body 3. Specifically, in a normal state, the pressing portion 51 of the rotating member 5 is urged by the urging members 8 via the clamp member 7 in a direction away from the main wall 31, and thereby the pressing portion 51 is kept in a state of being pressed against the overhang 36.

Next, actions of the locking tongue 2 when the webbing 11 is in the fastened state are described. In a normal state, as shown in FIG. 7 and FIG. 9A, a gap larger than the thickness of the webbing 11 is formed between the clamp member 7 and the main wall 31 of the tongue body 3.

Figure 8:
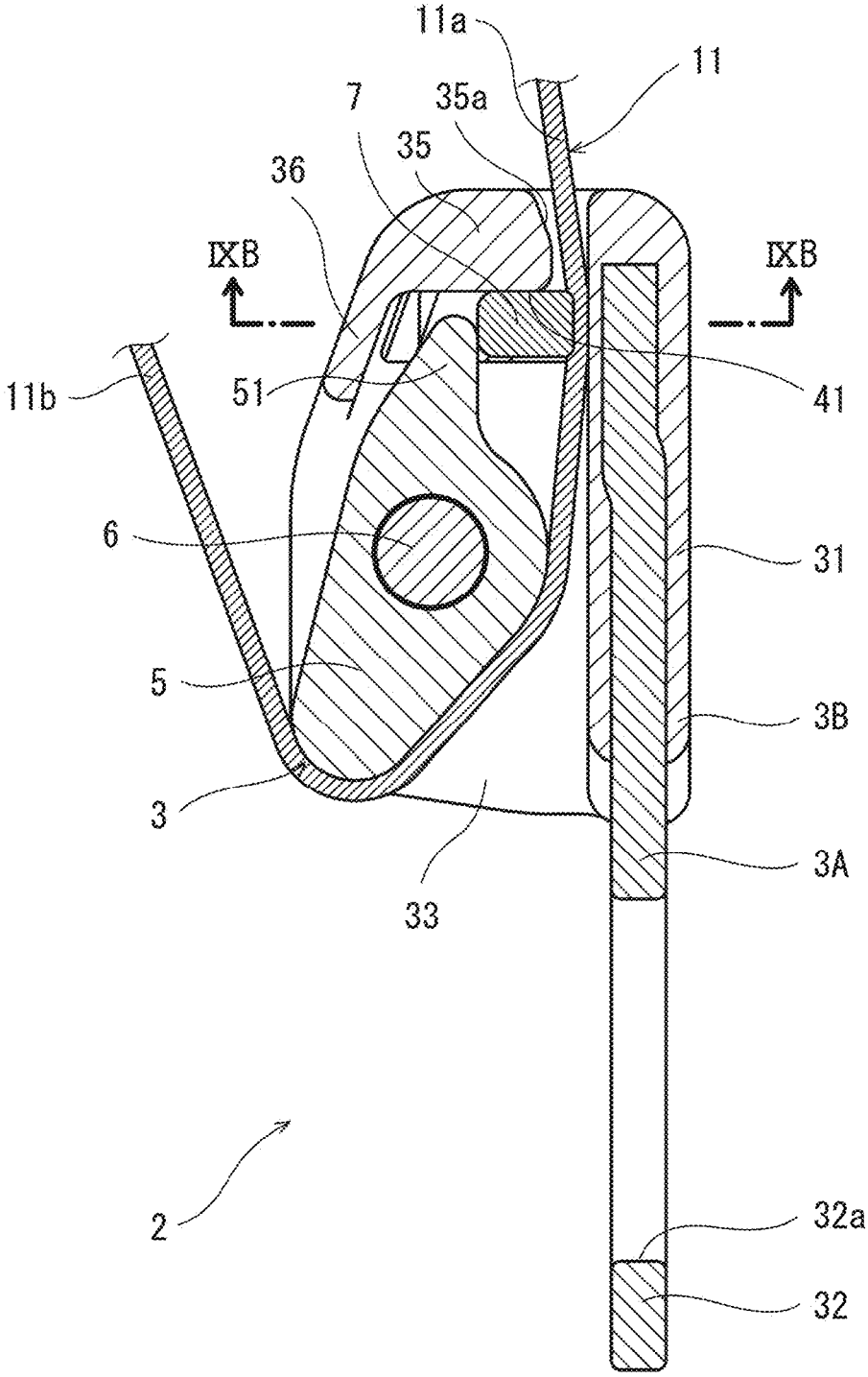
FIG. 8 is a sectional view of the locking tongue when the webbing is in the fastened state in an emergency of a vehicle.

On the other hand, in an emergency of the vehicle, as shown in FIG. 8, the tension of the lap belt 11b becomes greater than the tension of the shoulder belt 11a, causing the rotating member 5 to rotate in a direction from the shoulder belt 11a toward the lap belt 11b against the urging force of the urging members 8. Consequently, as shown in FIG. 8 and FIG. 9B, the webbing 11 is clamped between the clamp member 7 and the main wall 31.

As described above, in the locking tongue 2 of the present embodiment, the clamp member 7 is engaged with the guides 41 of the respective side walls 33 and 34 of the tongue body 3, and the rotating member 5 presses the clamp member 7 by rotating. Therefore, the number of rotating shafts 6 may be only one, i.e., the one intended for the rotating member 5. In addition, since the sliding direction of the clamp member 7 is the direction toward the main wall 31, the tongue body 3 can be readily shortened in the direction in which the main wall 31 and the insertion portion 32 are arranged side by side. This makes it possible to suppress an increase in the size of the locking tongue 2.

Further, in the present embodiment, the main wall 31 of the tongue body 3 includes the restrictors 42 to restrict the amount of clamping by which the webbing 11 is clamped by the clamp member 7. This makes it possible to prevent damage to the webbing 11 due to excessive clamping.

<Variations>

The present invention is not limited to the above-described embodiment. Various modifications can be made without departing from the scope of the present invention.

Figure 10B:
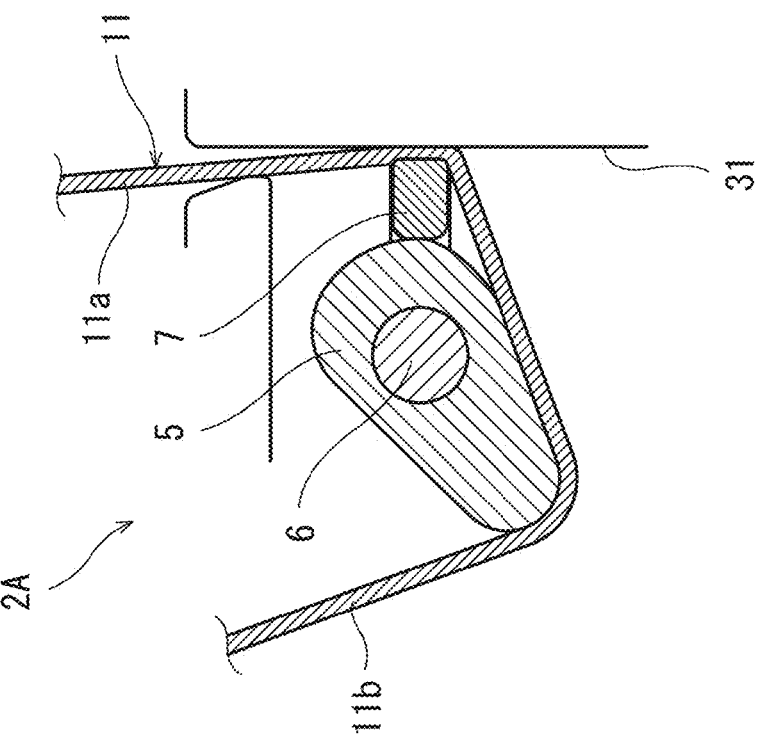
FIGS. 10A and 10B each show a sectional view of a locking tongue according to Variation 1, FIG. 10A showing the locking tongue when the webbing is in the fastened state in a normal state, FIG. 10B showing the locking tongue when the webbing is in the fastened state in an emergency of the vehicle.
Figure 10A:
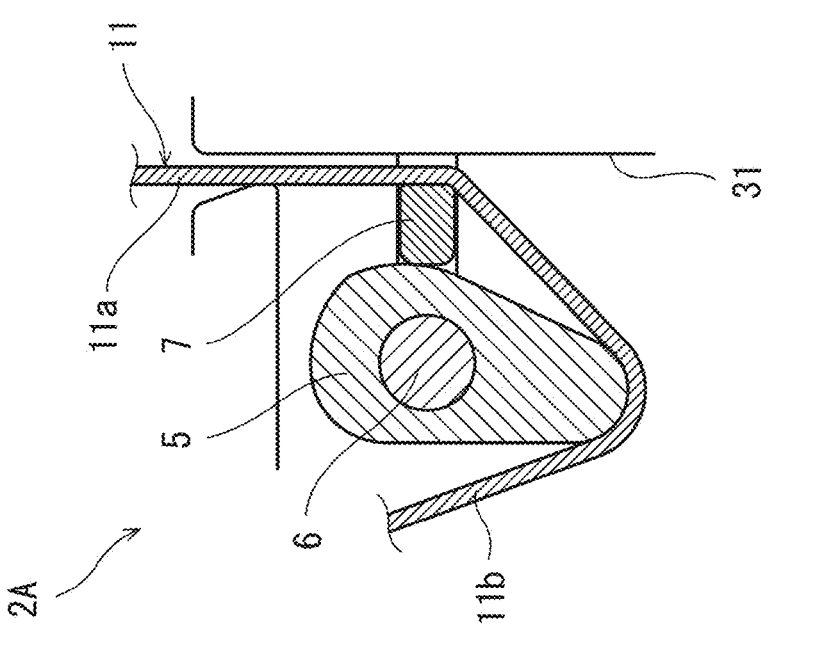
Figure 11B:
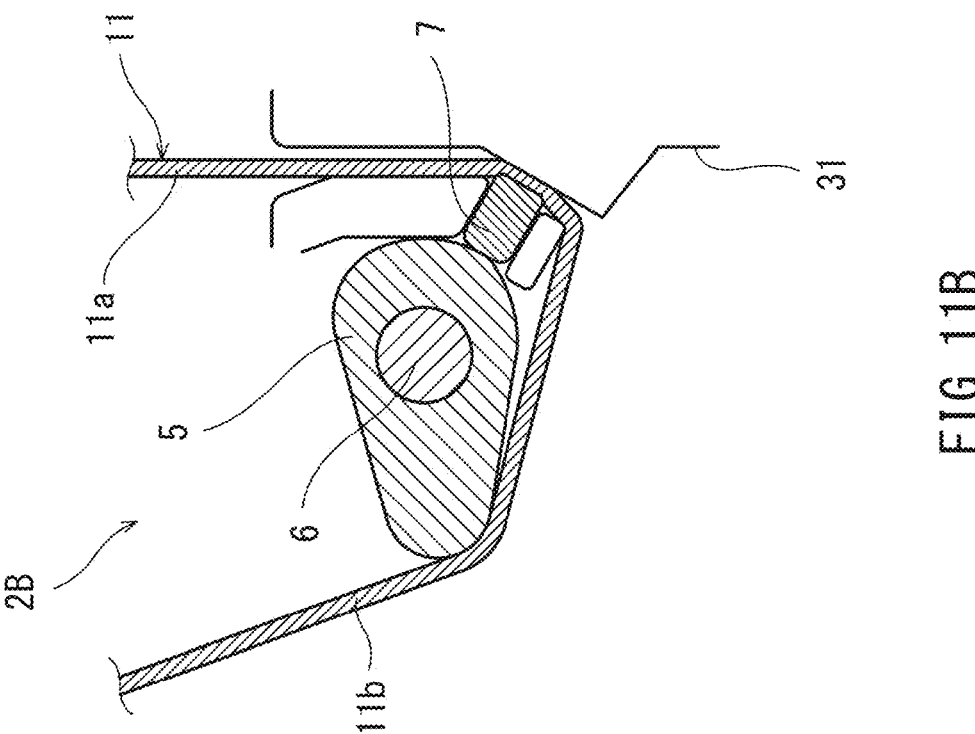
FIGS. 11A and 11B each show a sectional view of a locking tongue according to Variation 2, FIG. 11A showing the locking tongue when the webbing is in the fastened state in a normal state, FIG. 11B showing the locking tongue when the webbing is in the fastened state in an emergency of the vehicle.
Figure 11A:
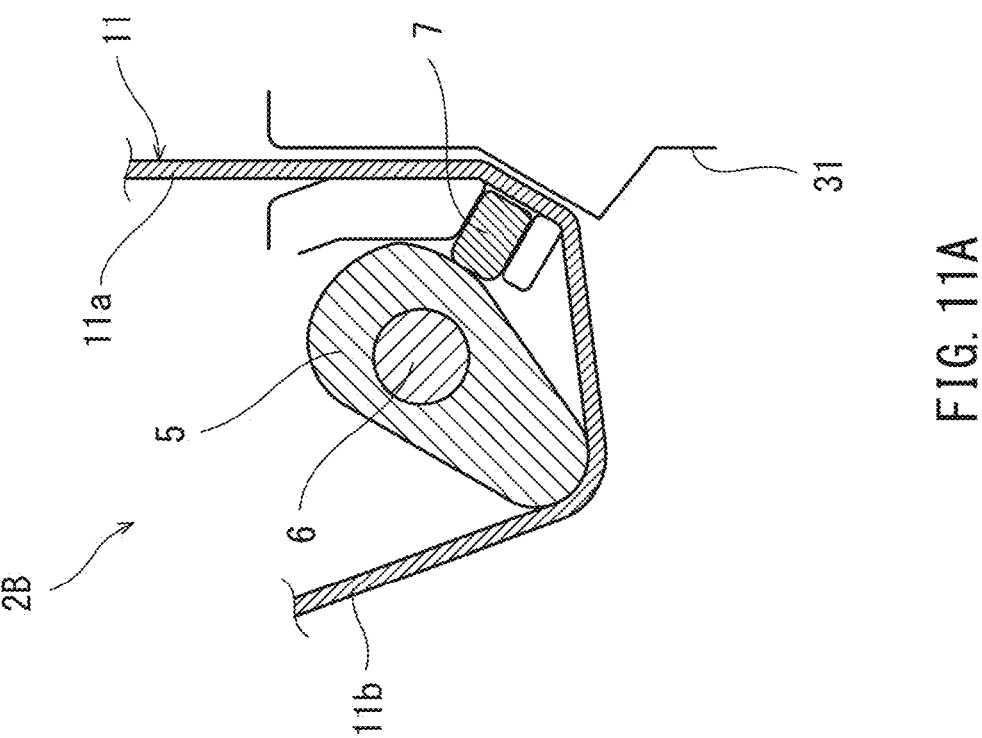
Figure 12:
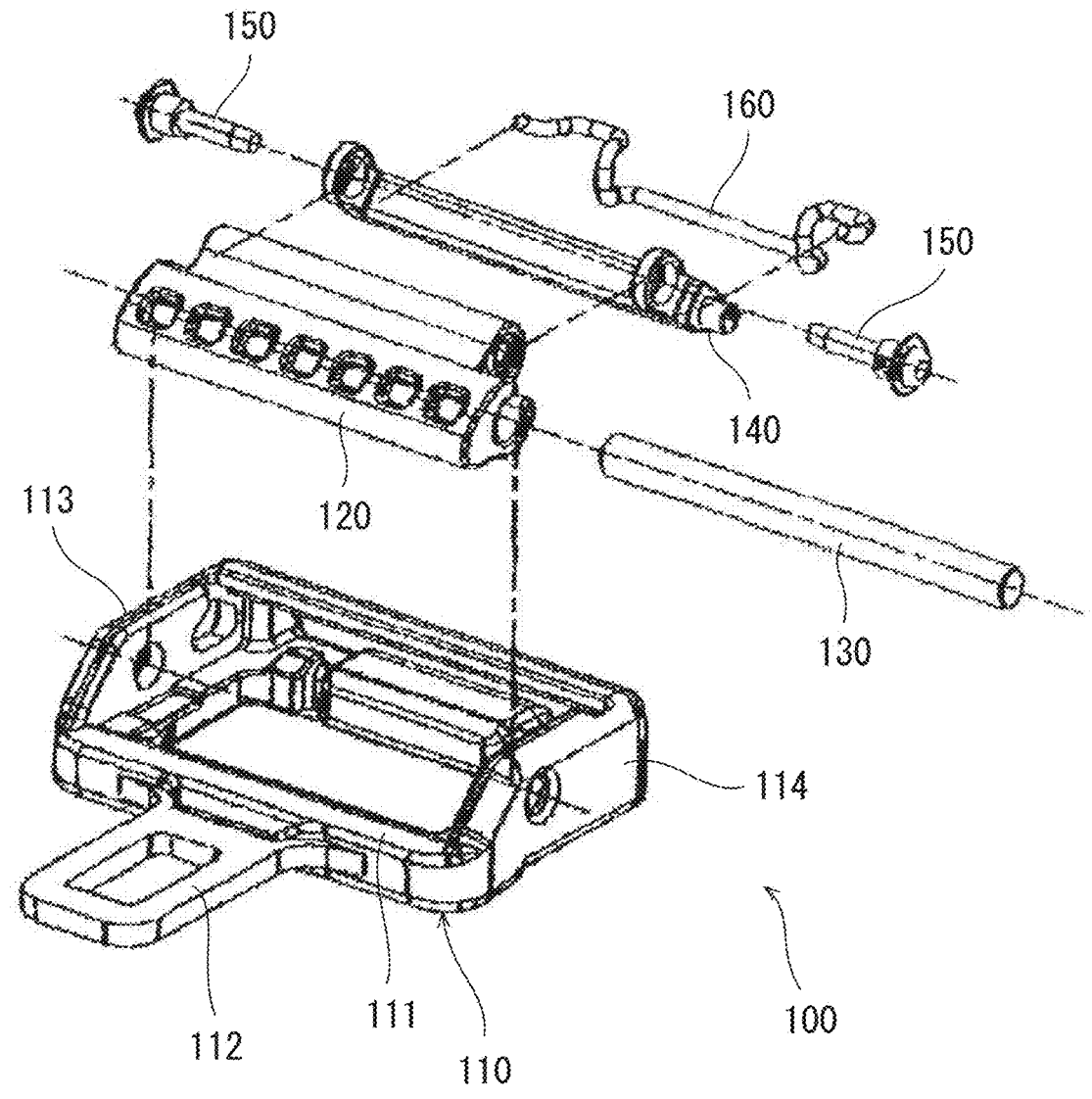
FIG. 12 is an exploded perspective view of a conventional locking tongue for a seat belt.
Figures 13A, 13B:
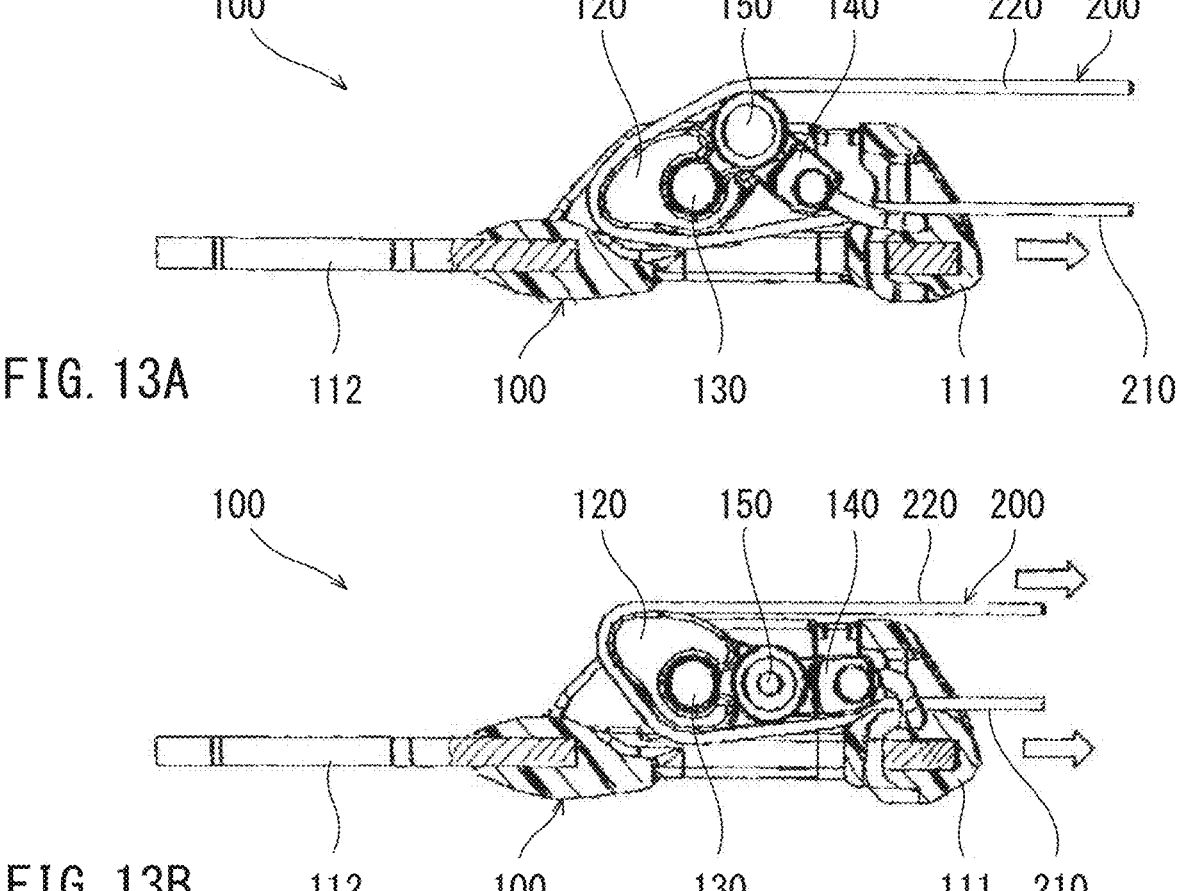
FIGS. 13A and 13B each show a sectional view of the locking tongue of FIG. 12, FIG. 13A showing the locking tongue when a webbing is in a fastened state in a normal state, FIG. 13B showing the locking tongue when the webbing is in the fastened state in an emergency of the vehicle.

For example, the clamp member 7 need not be, in the direction along the main wall 31 of the tongue body 3, positioned at the opposite side to the insertion portion 32 with respect to the center of rotation of the rotating member 5. For example, as in a locking tongue 2A according to Variation 1 shown in FIGS. 10A and 10B, instead of the pressing portion 51, the rotating member 5 may be in the shape of a cam, and in the direction along the main wall 31 of the tongue body 3, the position of the clamp member 7 may be the same as the position of the center of rotation of the rotating member 5. Alternatively, as in a locking tongue 2B according to Variation 2 shown in FIGS. 11A and 11B, in the direction along the main wall 31 of the tongue body 3, the position of the clamp member 7 may be shifted to the insertion portion 32 side from the center of rotation of the rotating member 5.

However, if the clamp member 7 is, in the direction along the main wall 31 of the tongue body 3, positioned at the opposite side to the insertion portion 32 with respect to the center of rotation of the rotating member 5 as in the above-described embodiment, the thickness of the locking tongue 2 in the thickness direction of the main wall 31 of the tongue body 3 can be reduced.

Further, in the above-described embodiment, the sliding direction of the clamp member 7 may be inclined relative to the thickness direction of the main wall 31 of the tongue body 3. In this case, the clamp member 7 is in a state where the clamp member 7 tends to be easily disengaged from the webbing 11 (this state is hereinafter simply referred to as "easily disengageable state") or in a state where the clamp member 7 tends to easily bite into the webbing 11 (this state is hereinafter simply referred to as "easily biting state"). Therefore, in this case, when the webbing 11 in the clamped state moves, friction force between the clamp member 7 and the webbing 11 is exerted in a direction to cause the clamp member 7 to be disengaged from the webbing 11, or in a direction to cause the clamp member 7 to bite into the webbing 11. On the other hand, if the sliding direction of the clamp member 7 is the thickness direction of the main wall 31 of the tongue body 3 as in the above-described embodiment, the following problems can be avoided: a lack of clamping force due to the easily disengageable state; damage to the webbing 11 due to the easily biting state; and interference with the return of the clamp member 7 due to the easily biting state.

Further, the clamp member 7 need not slide linearly. For example, the guides 41 may be arc-shaped, and the clamp member 7 may slide in a curvilinear manner. However, if the clamp member 7 slides linearly as in the above-described embodiment, the clamp member 7 can clamp the webbing 11 with a small stroke, and also, the shape of the guides 41 and the shape of the clamp member 7 can be made simple.

In the above-described embodiment, the two urging members 8, which are accommodated in the recesses 38 of both the side walls 33 and 34, are used. However, the number of urging members 8 may be one. In this case, the urging member 8 may be a tension coil spring provided between the overhang 36 and the clamp member 7. One end of the tension coil spring may be mounted to the center of the clamp member 7 in its length direction, and the other end of the tension coil spring may be mounted to the overhang 36.

<Summary>

One aspect of the present application provides, as a first mode, a locking tongue for a seat belt of a vehicle, the locking tongue being operated to switch a state of a webbing that is the seat belt between an unfastened state in which the webbing is extended and a fastened state in which the webbing is folded back to form a shoulder belt and a lap belt, the locking tongue being configured such that when the webbing is in the fastened state, in a normal state, the locking tongue allows the webbing to pass therethrough, whereas in an emergency of the vehicle, the locking tongue clamps the webbing, the locking tongue including: a tongue body including a main wall, a pair of side walls, and an insertion portion, the main wall being positioned at a front side of the webbing when the webbing is in the unfastened state, the pair of side walls protruding from both end portions of the main wall in a width direction of the webbing to a back side of the webbing, the insertion portion extending from the main wall and being a portion to be inserted in a buckle for the seat belt; a clamp member that is, when the webbing is in the unfastened state, positioned at the back side of the webbing and engaged with guides that are provided on the pair of side walls, respectively, such that the clamp member is slidable in a direction toward the main wall; a rotating member that is rotatably supported by the pair of side walls at the back side of the webbing when the webbing is in the unfastened state, wherein when the webbing is in the fastened state, the webbing is wound around the rotating member such that the webbing is folded back to form the shoulder belt and the lap belt, and the rotating member rotates in a direction from the shoulder belt toward the lap belt to press the clamp member such that the clamp member slides in the direction toward the main wall; and an urging member that urges the clamp member in a direction away from the main wall. In the normal state, a gap larger than a thickness of the webbing is formed between the clamp member and the main wall. In the emergency of the vehicle, tension of the lap belt becomes greater than tension of the shoulder belt, causing the rotating member to rotate in the direction from the shoulder belt toward the lap belt against urging force of the urging member, such that the webbing is clamped between the clamp member and the main wall.

According to the above configuration, the clamp member is engaged with the guides of the respective side walls of the tongue body, and the rotating member presses the clamp member by rotating. Therefore, the number of rotating shafts may be only one, i.e., the one intended for the rotating member. In addition, since the sliding direction of the clamp member is the direction toward the main wall, the tongue body can be readily shortened in the direction in which the main wall and the insertion portion are arranged side by side. This makes it possible to suppress an increase in the size of the locking tongue.

As a second mode, in the first mode, the clamp member may slide linearly. According to this configuration, the clamp member can clamp the webbing with a small stroke. Also, the shape of the guides and the shape of the clamp member can be made simple.

As a third mode, in the second mode, the clamp member may slide in a thickness direction of the main wall. In a case where the sliding direction of the clamp member is inclined relative to the thickness direction of the main wall of the tongue body, when the webbing in the clamped state moves, friction force between the clamp member and the webbing is exerted in a direction to cause the clamp member to be disengaged from the webbing, or in a direction to cause the clamp member to bite into the webbing. On the other hand, if the sliding direction of the clamp member is the thickness direction of the main wall of the tongue body, the following problems can be avoided: a lack of clamping force due to the above-described easily disengageable state; damage to the webbing due to the above-described easily biting state; and interference with the return of the clamp member due to the above-described easily biting state.

As a fourth mode, in any of the first to third modes, the clamp member may be, in a direction along the main wall, positioned at an opposite side to the insertion portion with respect to a center of rotation of the rotating member. According to this configuration, the thickness of the locking tongue in the thickness direction of the main wall of the tongue body can be reduced.

As a fifth mode, in any of the first to fourth modes, the main wall or the pair of side walls may include restrictors that, when the clamp member has slid in the direction toward the main wall, come into contact with the clamp member to restrict an amount of clamping by which the webbing is clamped by the clamp member. This configuration makes it possible to prevent damage to the webbing due to excessive clamping.

Another aspect of the present application provides, as a sixth mode, a seat belt device including: the locking tongue according to any one of the first to fifth modes; the buckle for the seat belt, the buckle being fixed to the vehicle and to be engaged with the locking tongue; the webbing that penetrates the locking tongue and whose one end side is fixed to the vehicle; and a retractor that accommodates therein the other end side of the webbing in such a manner that the other end side of the webbing is pullable out of the retractor.

What is claimed is:

1. A locking tongue for a seat belt of a vehicle, the locking tongue being operated to switch a state of a webbing that is the seat belt between an unfastened state in which the webbing is extended and a fastened state in which the webbing is folded back to form a shoulder belt and a lap belt, the locking tongue being configured such that when the webbing is in the fastened state, in a normal state, the locking tongue allows the webbing to pass therethrough, whereas in an emergency of the vehicle, the locking tongue clamps the webbing, the locking tongue comprising:

a tongue body including a main wall, a pair of side walls, and an insertion portion, the main wall being positioned at a front side of the webbing when the webbing is in the unfastened state, the pair of side walls protruding from both end portions of the main wall in a width direction of the webbing to a back side of the webbing, the insertion portion extending from the main wall and being a portion to be inserted in a buckle for the seat belt;

a clamp member that is, when the webbing is in the unfastened state, positioned at the back side of the webbing and engaged with guides that are provided on the pair of side walls, respectively, such that the clamp member is slidable in a direction toward the main wall;

a rotating member that is rotatably supported by the pair of side walls at the back side of the webbing when the webbing is in the unfastened state, wherein when the webbing is in the fastened state, the webbing is wound around the rotating member such that the webbing is folded back to form the shoulder belt and the lap belt, and the rotating member rotates in a direction from the shoulder belt toward the lap belt to press the clamp member such that the clamp member slides in the direction toward the main wall; and an urging member that urges the clamp member in a direction away from the main wall, wherein in the normal state, a gap larger than a thickness of the webbing is formed between the clamp member and the main wall, and in the emergency of the vehicle, tension of the lap belt becomes greater than tension of the shoulder belt, causing the rotating member to rotate in the direction from the shoulder belt toward the lap belt against urging force of the urging member, such that the webbing is clamped between the clamp member and the main wall.

2. The locking tongue according to claim 1, wherein the clamp member slides linearly.

3. The locking tongue according to claim 2, wherein the clamp member slides in a thickness direction of the main wall.

4. The locking tongue according to claim 1, wherein the clamp member is, in a direction along the main wall, positioned at an opposite side to the insertion portion with respect to a center of rotation of the rotating member.

5. The locking tongue according to claim 1, wherein the main wall or the pair of side walls include restrictors that, when the clamp member has slid in the direction toward the main wall, come into contact with the clamp member to restrict an amount of clamping by which the webbing is clamped by the clamp member.

6. A seat belt device comprising:

the locking tongue according to claim 1;

the buckle for the seat belt, the buckle being fixed to the vehicle and to be engaged with the locking tongue;

the webbing that penetrates the locking tongue and whose one end side is fixed to the vehicle; and a retractor that accommodates therein the other end side of the webbing in such a manner that the other end side of the webbing is pullable out of the retractor.

\* \* \* \* \*